(12) United States Patent
Zeng et al.

(10) Patent No.: US 8,705,910 B2
(45) Date of Patent: Apr. 22, 2014

(54) OPTICAL MODULE MANUFACTURING METHOD AND OPTICAL MODULE

(71) Applicant: Huawei Technologies Co., Ltd., Shenzhen (CN)

(72) Inventors: Tongxin Zeng, Shenzhen (CN); Fei Yu, Santa Clara, CA (US); Bin Xu, Ipswich (GB); Junying Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/758,159

(22) Filed: Feb. 4, 2013

(65) Prior Publication Data

US 2013/0148922 A1 Jun. 13, 2013

Related U.S. Application Data

(63) Continuation of application No. PCT/CN2011/071387, filed on Feb. 28, 2011.

(30) Foreign Application Priority Data

Aug. 4, 2010 (CN) .......................... 2010 1 0244885

(51) Int. Cl.
| | |
|---|---|
| G02B 6/26 | (2006.01) |
| G02B 6/12 | (2006.01) |
| G02B 6/34 | (2006.01) |
| G02B 6/42 | (2006.01) |
| G02B 6/10 | (2006.01) |
| B05D 5/06 | (2006.01) |

(52) U.S. Cl.
USPC .................... 385/18; 385/14; 385/36; 385/47; 385/129; 427/163.2; 427/163.4

(58) Field of Classification Search
USPC .................... 385/14, 15, 18, 36, 47, 129–132; 427/163.2, 163.4
See application file for complete search history.

(56) References Cited

U.S. PATENT DOCUMENTS

| | | |
|---|---|---|
| 2003/0081885 A1 | 5/2003 | Chen et al. |
| 2009/0016678 A1 | 1/2009 | Kawamura et al. |
| 2010/0313241 A1 | 12/2010 | Lee et al. |

FOREIGN PATENT DOCUMENTS

| | | |
|---|---|---|
| CN | 2540711 Y | 3/2003 |
| CN | 1781042 A | 5/2006 |

(Continued)

OTHER PUBLICATIONS

Foreign Communication From a Counterpart Application, PCT Application PCT/CN2011/071387, English Translation of Written Opinion dated Jun. 9, 2011, 4 pages.

(Continued)

Primary Examiner — Kaveh Kianni
Assistant Examiner — Hung Lam
(74) Attorney, Agent, or Firm — Conley Rose, P.C.; Grant Randolph; Nicholas K. Beaulieu

(57) ABSTRACT

An optical module manufacturing method includes: forming a first waveguide layer and a second waveguide layer on a first substrate and a second substrate respectively, or forming a first waveguide layer and a second waveguide layer on a first surface of a first substrate and a second surface of the first substrate respectively; disposing the first substrate on the second substrate; disposing a filter at an end of the first waveguide layer and the second waveguide layer, so that the filter is aligned with the second waveguide layer; and disposing a prism on the filter, so that a first reflective surface of the prism is aligned with the first waveguide layer, and a second reflective surface is aligned with the second waveguide layer. Embodiments of the present application further disclose an optical module.

21 Claims, 8 Drawing Sheets

(56) References Cited

FOREIGN PATENT DOCUMENTS

| | | |
|---|---|---|
| CN | 101154790 A | 4/2008 |
| CN | 201051158 Y | 4/2008 |
| CN | 101216582 A | 7/2008 |
| CN | 101344625 A | 1/2009 |
| CN | 201438229 U | 4/2010 |
| EP | 0324493 A2 | 1/1989 |
| EP | 0378226 A2 | 1/1990 |
| JP | 9-33878 A | 2/1997 |
| JP | 2001015871 A | 1/2001 |
| JP | 2003207662 A | 7/2003 |
| WO | 9607117 | 3/1996 |
| WO | 2007010184 A1 | 1/2007 |

OTHER PUBLICATIONS

Foreign Communication From a Counterpart Application, European Application No. 11752813.3, Extended European Search Report dated Aug. 5, 2013, 10 pages.

Foreign communication from a counterpart application, PCT Application PCT/CN2011/071387, English Translation International Search Report, 6 pages.

OPTICAL MODULE MANUFACTURING METHOD AND OPTICAL MODULE

CROSS-REFERENCE TO RELATED APPLICATIONS

This application is a continuation of International Application No. PCT/CN2011/071387, filed on Feb. 28, 2011, which claims priority to Chinese Patent Application No. 201010244885.1, filed on Aug. 4, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present application relates to the field of optical communications, and in particular, to an optical module manufacturing method and an optical module.

BACKGROUND

With the network evolution of substitution of an optical fiber for a copper wire, high density of ports of an optical access communication device becomes one of the technical developing trends in the future. To meet requirements of high density technologies, great challenges exist in aspects of miniaturization and high density of optical modules, that is, the number of optical interfaces needs to be increased in space of a predetermined size.

In a conventional optical component TO packaging technology, due to limitations of structural members and processing precision as well as the size of connectors, existing packaging design of components has already reached the maximum extent. For an optical module implemented by a currently emerging Planner Lightwave Circuit (PLC) (e.g., an optical waveguide) technology in the industry, a common optical channel design method is a single fiber bidirectional mode.

An existing optical channel based on the PLC design is single fiber bidirectional concurrent design, a receiving optical channel and a transmitting optical channel need to be fabricated simultaneously in a same plane, and in order to assemble a laser diode (LD) and optical fibers, the receiving optical channel and the transmitting optical channel need to keep a certain distance. Therefore, the optical module fabricated by using this technology still occupies large planar space, and input/output (I/O) density of the optical module is not high.

SUMMARY

Embodiments of the present application provide an optical module manufacturing method and an optical module, to reduce planar space occupied by the optical module, and improve I/O density of the optical module.

An embodiment of the present application provides an optical module manufacturing method, including: forming a first waveguide layer and a second waveguide layer on a first substrate and a second substrate respectively, or forming a first waveguide layer and a second waveguide layer on a first surface of a first substrate and a second surface of the first substrate respectively, where the first waveguide layer and the second waveguide layer each includes at least one optical channel, the first waveguide layer is located above the second waveguide layer, and the first waveguide layer is parallel to the second waveguide layer; disposing the first substrate on the second substrate, so that the first substrate is parallel to the second substrate, and the first waveguide layer is parallel to the second substrate; disposing a filter at an end of the first waveguide layer and the second waveguide layer, so that the filter is aligned with the second waveguide layer; and disposing a prism on the filter, so that a first reflective surface of the prism is aligned with the first waveguide layer, and a second reflective surface is aligned with the second waveguide layer, where a position among the filter, the prism, the first waveguide layer and the second waveguide layer enables an optical signal input to the optical channel in the second waveguide layer to enter the filter after being transmitted by the prism; and an optical signal input to the optical channel in the first waveguide layer to enter the optical channel in the second waveguide layer after being reflected by the prism, and to be output through the optical channel in the second waveguide layer.

An embodiment of the present application provides an optical module, including: a first substrate and a second substrate, a first waveguide layer and a second waveguide layer, where the first waveguide layer and the second waveguide layer are located on the first substrate and the second substrate respectively, or are located on a first surface of the first substrate and a second surface of the first substrate respectively; the first substrate is parallel to the second substrate, the first waveguide layer and the second waveguide layer each includes at least one optical channel, and the first waveguide layer is located above the second waveguide layer; the first waveguide layer is parallel to the second waveguide layer, and the first waveguide layer is parallel to a surface of the second substrate; and the first substrate is disposed on the second substrate; a filter is disposed at an end of the first waveguide layer and the second waveguide layer, so that the filter is aligned with the second waveguide layer; and a prism is disposed on the filter, so that a first reflective surface of the prism and a second reflective surface of the prism are aligned with the first waveguide layer and the second waveguide layer respectively; and a position among the filter, the prism, the first waveguide layer and the second waveguide layer enables an optical signal input to the optical channel in the second waveguide layer to enter the filter after being transmitted by the prism; and an optical signal input to the optical channel in the first waveguide layer to enter the optical channel in the second waveguide layer after being reflected by the prism, and to be output through the optical channel in the second waveguide layer.

Through the foregoing technical solutions in the embodiments of the present application, the optical module is fabricated with two waveguide layers in a perpendicular direction (Z direction), the two waveguide layers, the prism, and the filter form an optical path, and a positional relationship among the two waveguide layers, the prism, and the filter enables an optical signal input to the optical channel in the second waveguide layer to enter the filter after being transmitted by the prism; and an optical signal input to the optical channel in the first waveguide layer to enter the optical channel in the second waveguide layer after being reflected by the prism, and to be output through the optical channel in the second waveguide layer. Therefore, Z-direction space is fully utilized, thereby reducing the width of the optical channel and the planar space occupied by the optical module, improving the I/O density of the optical module, and further improving entire system density of a system where the optical module is located.

BRIEF DESCRIPTION OF THE DRAWINGS

To illustrate the technical solutions according to the embodiments of the present application or in the prior art more clearly, accompanying drawings needed for describing the embodiments or the prior art are introduced briefly in the following. Apparently, the accompanying drawings in the following description are only some embodiments of the present application, and persons of ordinary skill in the art may further obtain other drawings from the accompanying drawings without creative efforts.

DETAILED DESCRIPTION

The technical solutions according to the embodiments of the present application are clearly and fully described in the following with reference to the accompanying drawings in the embodiments of the present application. Obviously, the embodiments to be described are only part of rather than all of the embodiments of the present application. All other embodiments obtained by persons of ordinary skill in the art based on the embodiments of the present application without creative efforts shall fall within the protection scope of the present application.

Figure 1:
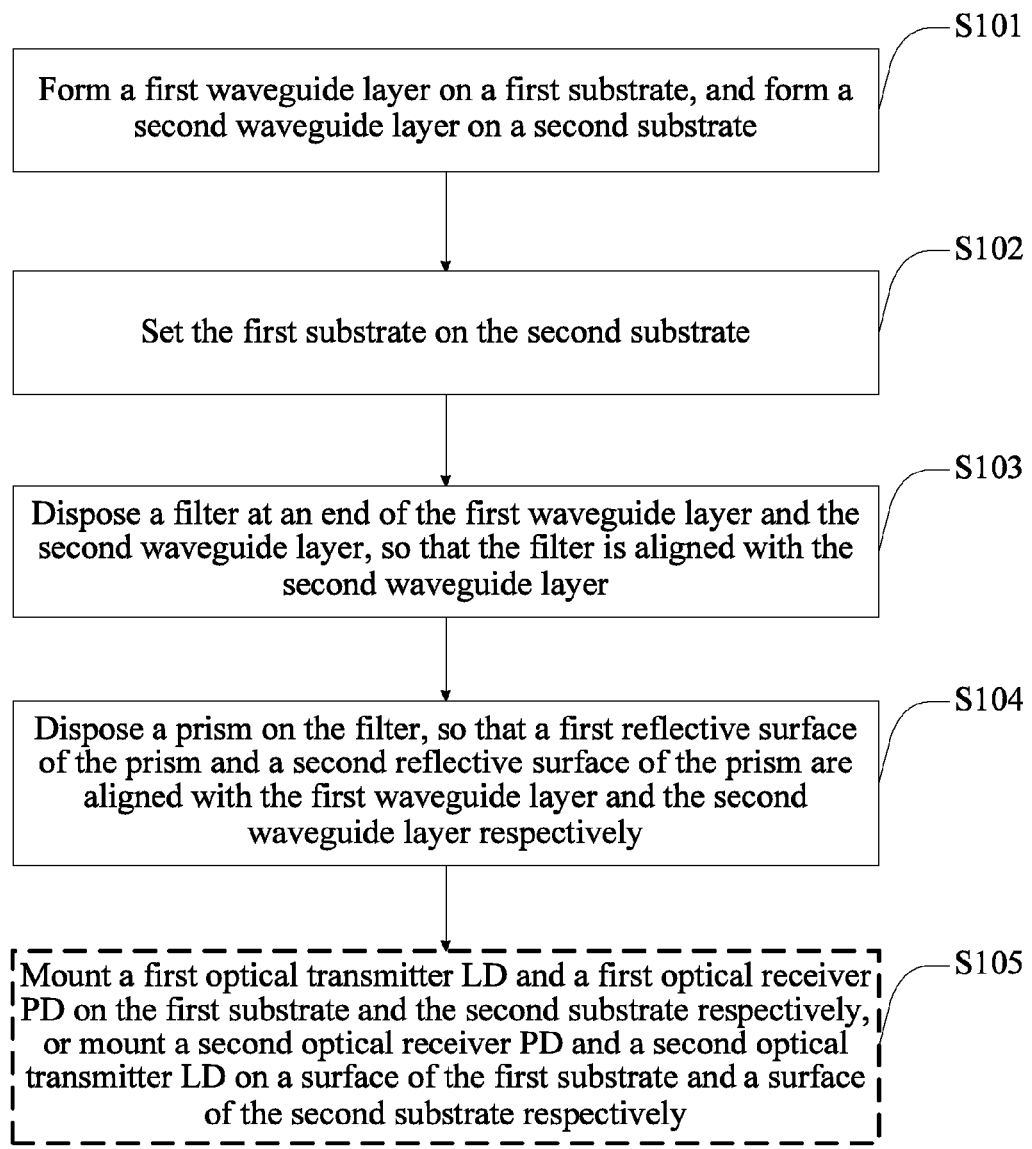
FIG. 1 is a flow chart of an optical module manufacturing method according to an embodiment of the present application.

As shown in FIG. 1, an embodiment of the present application provides an optical module manufacturing method, including:

S101: Form a first waveguide layer on a first substrate, and form a second waveguide layer on a second substrate, where the first waveguide layer includes at least one optical channel, and the second waveguide layer includes at least one optical channel, the first waveguide layer is located above the second waveguide layer, and the first waveguide layer is parallel to the second waveguide layer.

In an embodiment, the first substrate and the second substrate may be formed on a preset material (for example, glass).

In an embodiment, the optical channel of the first waveguide layer and the optical channel of the second waveguide layer each is made of a preset optical waveguide material with a refractive index which is greater than that of the material of the substrates (the first substrate and the second substrate).

In an embodiment, in a proper processing method (for example, a deposition method, an ion-exchange method or a film coating process), the first waveguide layer and the second waveguide layer may be formed on surfaces of the first substrate and the second substrate respectively.

In an embodiment, in a proper processing method (for example, a deposition method, an ion-exchange method or a film coating process), the first waveguide layer and the second waveguide layer may be formed inside the first substrate and the second substrate respectively.

S102: Dispose the first substrate on the second substrate, so that the first substrate is parallel to the second substrate, and the first waveguide layer is parallel to the second substrate.

In an embodiment, the first substrate may be bonded to the second substrate by an adhesive. In an embodiment, the first substrate may also be fixed on the second substrate through a fixing device such as a screw or nut, and in another embodiment, the first substrate may also be bonded to the second substrate in a manner of tin soldering or ultrasonic soldering.

S103: Dispose a filter at an end of the first waveguide layer and the second waveguide layer, so that the filter is aligned with the second waveguide layer.

In an embodiment, a filter may be mounted on a surface of the second substrate, so that the filter is located at an end of the first waveguide layer and the second waveguide layer, and is aligned with the second waveguide layer. In an embodiment, the filter may be bonded to a surface of the second substrate by an adhesive. In another embodiment, the filter may also be bonded to a surface of the second substrate in a manner of tin soldering or ultrasonic soldering. In an embodiment, a filter film is coated on at least one surface of the filter.

S104: Dispose a prism on the filter, so that a first reflective surface of the prism and a second reflective surface of the prism are aligned with the first waveguide layer and the second waveguide layer respectively. A position among the filter, the prism, the first waveguide layer and the second waveguide layer enables an optical signal input to the optical channel in the second waveguide layer to enter the filter after being transmitted by the prism; and an optical signal input to the optical channel in the first waveguide layer to enter the optical channel in the second waveguide layer after being reflected by the prism, and to be output through the optical channel in the second waveguide layer.

In an embodiment, the prism may be bonded to the surface of the filter by an adhesive.

In an embodiment, a total reflection film is coated on the first reflective surface of the prism, where the first reflective surface of the prism is aligned with the first waveguide layer; and an anti-reflection film is coated on the second reflective surface of the prism, where the second reflective surface of the prism is aligned with the second waveguide layer.

Through the foregoing technical solution in the embodiment of the present application, the optical module is fabricated with two waveguide layers in a perpendicular direction (Z direction), the two waveguide layers, the prism, and the filter form an optical path, and a positional relationship among the two waveguide layers, the prism, and the filter enables an optical signal input to the optical channel in the second waveguide layer to enter the filter after being transmitted by the prism; and an optical signal input to the optical channel in the first waveguide layer to enter the optical channel in the second waveguide layer after being reflected by the prism, and to be output through the optical channel in the second waveguide layer. Therefore, Z-direction space is fully utilized, thereby reducing the width of the optical channel and planar space occupied by the optical module, improving I/O density of the optical module, and further improving entire system density of a system where the optical module is located.

In another embodiment, as shown by the dotted line block in FIG. 1, the method may further include:

S105: Mount a first optical transmitter LD and a first optical receiver photo diode (PD) on the first substrate and the second substrate respectively, where a position among the filter, the prism, the first waveguide layer and the second waveguide layer enables an optical signal input to the optical channel in the second waveguide layer to enter the filter after being transmitted by the prism, and to enter the first PD through the filter; and an optical signal transmitted by the first LD to enter the optical channel in the first waveguide layer, then to enter the optical channel in the second waveguide layer after being reflected by the prism, and to be output through the optical channel in the second waveguide layer.

Alternatively, mount a second optical receiver PD and a second optical transmitter LD on the first substrate and the second substrate respectively, where a position among the filter, the prism, the first waveguide layer and the second waveguide layer enables an optical signal transmitted by the second LD to enter the filter, then to enter the optical channel in the second waveguide layer after being transmitted by the prism, and to be output through the optical channel in the second waveguide layer; and an optical signal input to the optical channel in the second waveguide layer to enter the optical channel in the first waveguide layer after being reflected by the prism, and to enter the second PD through the optical channel in the first waveguide layer.

In an embodiment, the first LD and the first PD may be bonded to a surface of the first substrate and a surface of the second substrate in a manner of an adhesive, tin soldering or ultrasonic soldering respectively. In an embodiment, the second PD and the second LD may be bonded to a surface of the first substrate and a surface of the second substrate in a manner of an adhesive, tin soldering or ultrasonic soldering respectively.

It should be noted that, in an embodiment, the preceding adhesive used for bonding may be an adhesive with a coefficient of thermal expansion (CTE) which is close to a CTE of the first substrate or the second substrate. That is to say, an absolute value of a difference between the CTE of the preceding adhesive used for bonding and the CTE of the first substrate or the second substrate is in a preset range.

In an embodiment, the electrical connection may also be formed between the first LD and the first PD, and the electrical connection between the first LD and the first PD may be accomplished by using soldering or lead binding. In an embodiment, electrical connection may also be formed between the second LD and the second PD, and the electrical connection between the second LD and the second PD may be accomplished by using soldering or lead binding.

Through the foregoing technical solution in the embodiment of the present application, the optical module is fabricated with two waveguide layers in a perpendicular direction (Z direction), and the two waveguide layers, the prism, the filter, the LD and the PD form a photoelectric path. Therefore, Z-direction space is fully utilized, thereby reducing the width of the optical channel and the planar space occupied by the optical module, improving the I/O density of the optical module, and further improving the entire system density of the system where the optical module is located.

Figure 2:
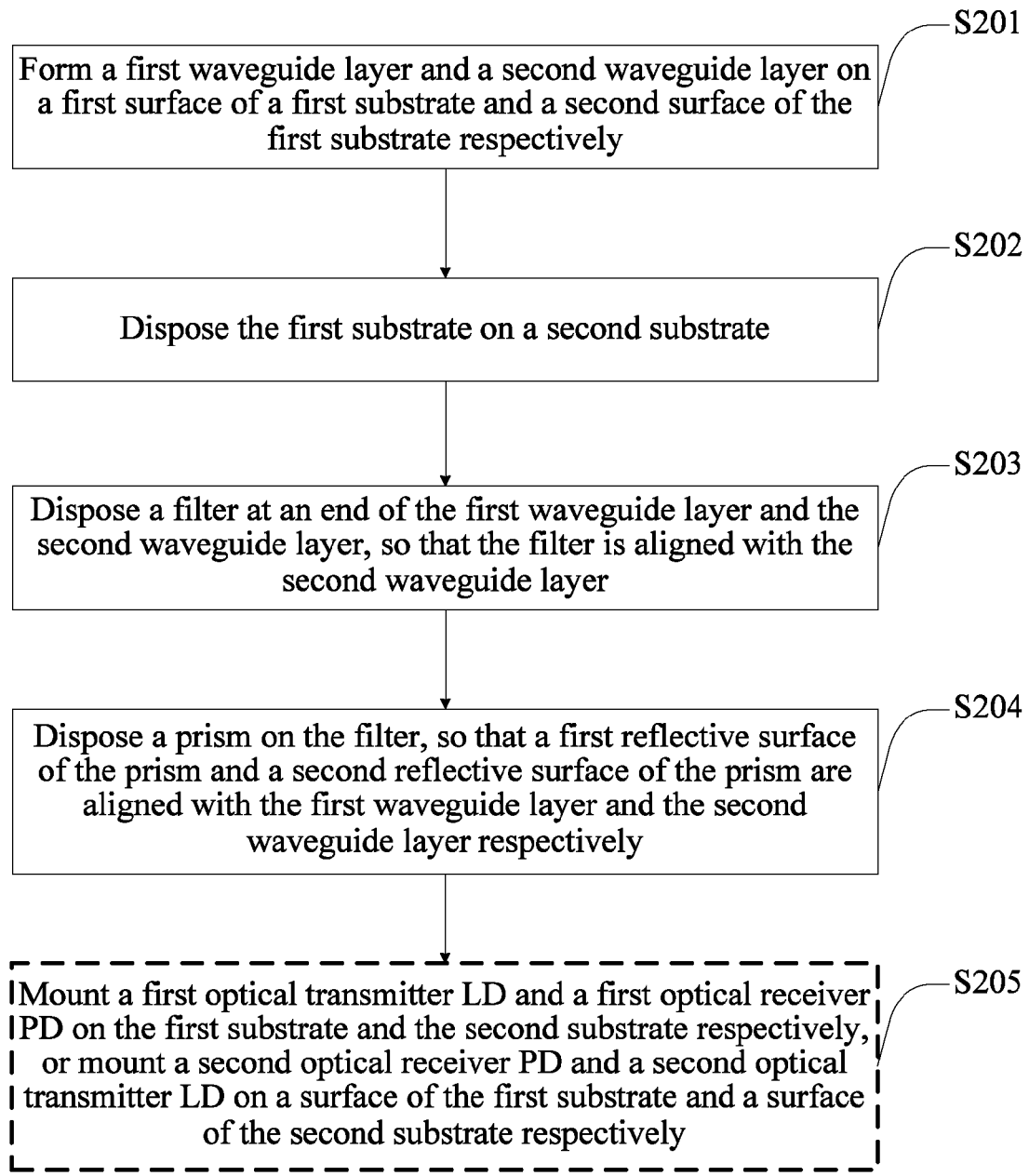
FIG. 2 is a flow chart of an optical module manufacturing method according to an embodiment of the present application.

As shown in FIG. 2, an embodiment of the present application provides an optical module manufacturing method, where the method includes:

S201: Form a first waveguide layer and a second waveguide layer on a first surface of a first substrate and a second surface of the first substrate respectively, where the first waveguide layer includes at least one optical channel, and the second waveguide layer includes at least one optical channel, the first waveguide layer is located above the second waveguide layer, and the first waveguide layer is parallel to the second waveguide layer.

In an embodiment, the first substrate may be formed on a preset material (for example, glass).

In an embodiment, the optical channel of the first waveguide layer and the optical channel of the second waveguide layer each is made of a preset optical waveguide material with a refractive index which is greater than that of the material of the first substrate.

In an embodiment, in a proper processing method (for example, a deposition method, an ion-exchange method or a film coating process), the first waveguide layer and the second waveguide layer may be formed on an upper surface of the first substrate and a lower surface of the first substrate respectively. That is, the first surface of the first substrate and the second surface of the first substrate are the upper surface of the first substrate and the lower surface of the first substrate respectively.

In an embodiment, in a proper processing method (for example, a deposition method, an ion-exchange method or a film coating process), the first waveguide layer and the second waveguide layer may be formed inside the first substrate. That is, the first surface of the first substrate and the second surface of the first substrate are located inside the first substrate.

S202: Dispose the first substrate on a second substrate, so that the first substrate is parallel to the second substrate, and the first waveguide layer is parallel to the second substrate.

S203: Dispose a filter at an end of the first waveguide layer and the second waveguide layer, so that the filter is aligned with the second waveguide layer.

In an embodiment, a filter may be mounted on a surface of the second substrate, so that the filter is located at an end of the first waveguide layer and the second waveguide layer, the filter is aligned with the second waveguide layer, and the second substrate is parallel to the first substrate. In an embodiment, the filter may be bonded to a surface of the second substrate by an adhesive. In another embodiment, the filter may also be bonded to a surface of the second substrate in a manner of tin soldering or ultrasonic soldering. In an embodiment, a filter film is coated on at least one surface of the filter.

In an embodiment, a filter may be fabricated on an end surface at one side of the first substrate, so that the filter and the first substrate are integrally formed and aligned with the second waveguide layer, and a filter film is coated on a surface of the filter.

S204: Dispose a prism on the filter, so that a first reflective surface of the prism and a second reflective surface of the prism are aligned with the first waveguide layer and the second waveguide layer respectively.

In an embodiment, the prism may be bonded to a surface of the filter in a manner of an adhesive, tin soldering or ultrasonic soldering. In an embodiment, a total reflection film is coated on the first reflective surface of the prism, where the first reflective surface of the prism is aligned with the first waveguide layer; and an anti-reflection film is coated on the second reflective surface of the prism, where the second reflective surface of the prism is aligned with the second waveguide layer.

It should be noted that, in an embodiment, during fabrication steps S203 to S204, when the filter is fabricated on an end surface at one side of the first substrate, the filter may also be used as the second reflective surface of the prism, and the first reflective surface of the prism is fabricated on an end surface at one side of the first substrate, so that the first reflective surface is aligned with the first waveguide layer. That is to say, the first reflective surface of the prism and the second reflective surface of the prism may be fabricated on an end surface at one side of the first substrate, so that the first reflective surface of the prism and the second reflective surface of the prism are aligned with the first waveguide layer and the second waveguide layer respectively. A total reflection film is coated on the first reflective surface, and a filter film is coated on the second reflective surface, so that the second reflective surface has a filtering function of the filter. Through the foregoing method, the first waveguide layer, the second waveguide layer, the prism and the filter may be integrally formed.

In an embodiment, the first reflective surface and the second reflective surface each may form a 45° angle with the first waveguide layer. Here, it should be noted that, in this embodiment, the first waveguide layer and the second waveguide layer are located on an upper surface of the first substrate and a lower surface of the first substrate respectively, and the first waveguide layer is parallel with the second waveguide layer, so that when the first reflective surface and the second reflective surface each forms a 45° angle with the first waveguide layer, the first reflective surface and the second reflective surface also each forms a 45° angle with the second waveguide layer.

Through the foregoing technical solution in the embodiment of the present application, the optical module is fabricated with two waveguide layers in a perpendicular direction (Z direction), the two waveguide layers, the prism, and the filter form an optical path, and a positional relationship among the two waveguide layers, the prism, and the filter enables an optical signal input to the optical channel in the second waveguide layer to enter the filter after being transmitted by the prism; and an optical signal input to the optical channel in the first waveguide layer to enter the optical channel in the second waveguide layer after being reflected by the prism, and to be output through the optical channel in the second waveguide layer. Therefore, Z-direction space is fully utilized, thereby reducing the width of the optical channel and planar space occupied by the optical module, improving I/O density of the optical module, and further improving entire system density of a system where the optical module is located.

As shown by the dotted line block in FIG. 2, in another embodiment, the method may further include:

S205: Mount a first optical transmitter LD and a first optical receiver PD on the first substrate and the second substrate respectively, where a position among the filter, the prism, the first waveguide layer and the second waveguide layer enables an optical signal input to the optical channel in the second waveguide layer to enter the filter after being transmitted by the prism, and to enter the first PD through the filter; and an optical signal transmitted by the first LD to enter the optical channel in the first waveguide layer, then to enter the optical channel in the second waveguide layer after being reflected by the prism, and to be output through the optical channel in the second waveguide layer.

Alternatively, mount a second optical receiver PD and a second optical transmitter LD on the first substrate and the second substrate respectively, where a position among the filter, the prism, the first waveguide layer and the second waveguide layer enables an optical signal transmitted by the second LD to enter the filter, then to enter the optical channel in the second waveguide layer after being transmitted by the prism, and to be output through the optical channel in the second waveguide layer; and an optical signal input to the optical channel in the second waveguide layer to enter the optical channel in the first waveguide layer after being reflected by the prism, and to enter the second PD through the optical channel in the first waveguide layer.

In an embodiment, the first LD and the first PD may be bonded to a surface of the first substrate and a surface of the second substrate in a manner of an adhesive, tin soldering or ultrasonic soldering respectively. In an embodiment, the second PD and the second LD may be bonded to a surface of the first substrate and a surface of the second substrate in a manner of an adhesive, tin soldering or ultrasonic soldering respectively.

It should be noted that, in an embodiment, the preceding adhesive used for bonding may be an adhesive with a CTE which is close to a CTE of the first substrate or the second substrate. That is to say, an absolute value of a difference between the CTE of the preceding adhesive used for bonding and the CTE of the first substrate or the second substrate is in a preset range.

In an embodiment, the electrical connection may also be formed between the first LD and the first PD, and the electrical connection between the first LD and the first PD may be accomplished by using soldering or lead binding. In an embodiment, electrical connection may also be formed between the second LD and the second PD, and the electrical connection between the second LD and the second PD may be accomplished by using soldering or lead binding.

Through the foregoing technical solution in the embodiment of the present application, the optical module is fabricated with two waveguide layers in a perpendicular direction (Z direction), the two waveguide layers, the prism, the filter, the LD and the PD form a photoelectric path, and a positional relationship among the two waveguide layers, the prism, and the filter enables an optical signal input to the optical channel in the second waveguide layer to enter the filter after being transmitted by the prism; and an optical signal input to the optical channel in the first waveguide layer to enter the optical channel in the second waveguide layer after being reflected by the prism, and to be output through the optical channel in the second waveguide layer. Therefore, Z-direction space is fully utilized, thereby reducing the width of the optical channel and the planar space occupied by the optical module, improving the I/O density of the optical module, and further improving the entire system density of the system where the optical module is located.

Figure 3:
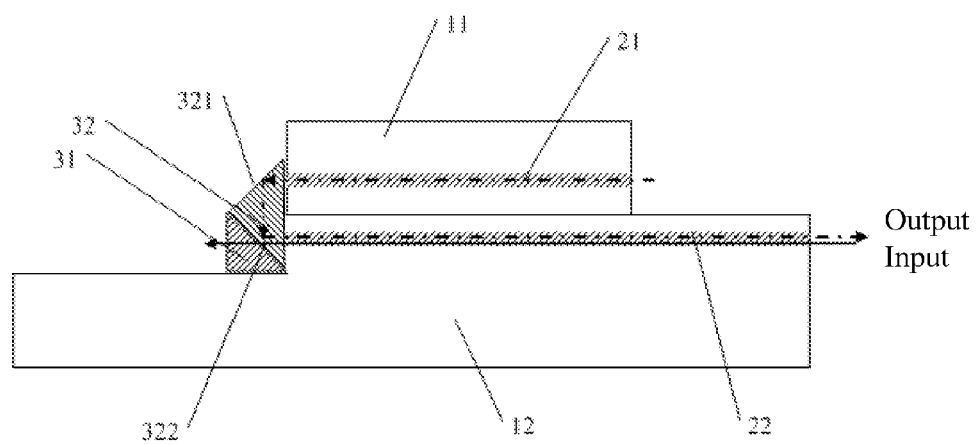
FIG. 3 is a structural diagram of an optical module according to an embodiment of the present application.

As shown in FIG. 3, an embodiment of the present application provides an optical module, including: a first substrate 11, a second substrate 12, a first waveguide layer 21, a second waveguide layer 22, a filter 31 and a prism 32.

The first waveguide layer 21 and the second waveguide layer 22 are located on the first substrate 11 and the second substrate 12 respectively, the first substrate 11 is parallel to the second substrate 12, the first waveguide layer 21 includes at least one optical channel, and the second waveguide layer 22 includes at least one optical channel. The first waveguide layer 21 is located above the second waveguide layer 22, the first waveguide layer 21 is parallel to the second waveguide layer 22, the first waveguide layer 21 is parallel to the second substrate 12, and the first substrate 11 is disposed on the second substrate 12.

The filter 31 is disposed at an end of the first waveguide layer 21 and the second waveguide layer 22, and the filter 31 is aligned with the second waveguide layer 22. The prism 32 is disposed on the filter 31, and a first reflective surface 321 of the prism 32 and a second reflective surface 322 of the prism 32 are aligned with the first waveguide layer 21 and the second waveguide layer 22 respectively.

Figure 4:
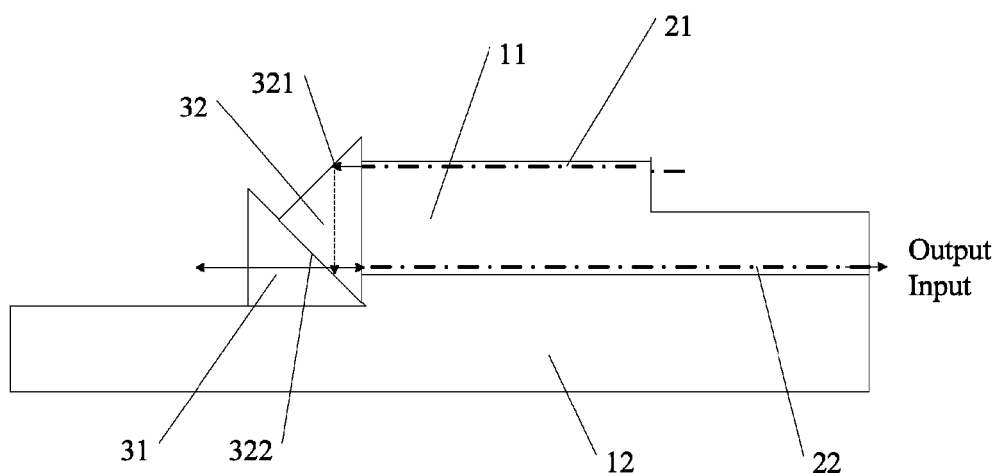
FIG. 4 is a structural diagram of an optical module according to an embodiment of the present application.

A position among the filter 31, the prism 32, the first waveguide layer 21 and the second waveguide layer 22 enables an optical signal input to the optical channel in the second waveguide layer 22 to enter the filter 31 after being transmitted by the prism 32 (indicated by the light along the direction of the left arrow in the second waveguide layer 22 in FIG. 4); and an optical signal input to the optical channel in the first waveguide layer 21 (indicated by the light along the direction of the left arrow in the first waveguide layer 21 in FIG. 4) to enter the optical channel in the second waveguide layer 22 after being reflected by the prism 32 (indicated by the light along the direction of the right arrow in the second waveguide layer 22 in FIG. 4), and to be output through the optical channel in the second waveguide layer 22.

It should be noted that, in an embodiment, the filter 31 may be mounted on the second substrate 12, and the filter 31 is located at an end of the first waveguide layer 21 and the second waveguide layer 22 and is aligned with the second waveguide layer 22.

It should be noted that, in an embodiment, widths of cross-sections of the first waveguide layer 21 and the second waveguide layer 22 are equal, or widths of cross-sections of the first waveguide layer 21 and the second waveguide layer 22 are equal in an allowable error range.

Through the foregoing technical solution in the embodiment of the present application, the optical module is fabricated with two waveguide layers in a perpendicular direction (Z direction), the two waveguide layers, the prism, and the filter form an optical path, and a positional relationship among the two waveguide layers, the prism, and the filter enables an optical signal input to the optical channel in the second waveguide layer to enter the filter after being transmitted by the prism; and an optical signal input to the optical channel in the first waveguide layer to enter the optical channel in the second waveguide layer after being reflected by the prism, and to be output through the optical channel in the second waveguide layer. Therefore, Z-direction space is fully utilized, thereby reducing the width of the optical channel and planar space occupied by the optical module, improving I/O density of the optical module, and further improving entire system density of a system where the optical module is located.

Figure 3A:
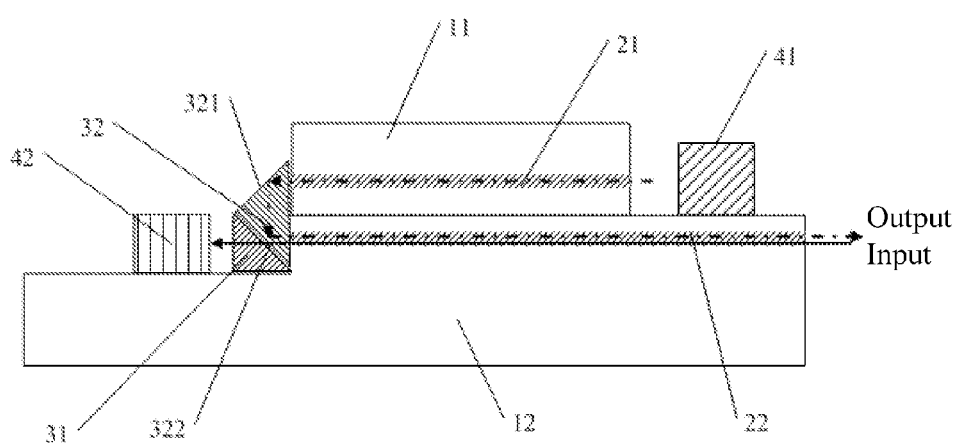
FIG. 3a is a structural diagram of an optical module according to an embodiment of the present application.

As shown in FIG. 3a, in an embodiment, the optical module may further include: a first LD 41 and a first PD 42 which are mounted on the first substrate 11 and the second substrate 12 respectively, where a position among the filter 31, the prism 32, the first waveguide layer 21 and the second waveguide layer 22 enables an optical signal input to the optical channel in the second waveguide layer 22 to enter the filter 31 after being transmitted by the prism 32, and to enter the first PD 42 through the filter 31; and an optical signal transmitted by the first LD 41 to enter the optical channel in the first waveguide layer 21, then to enter the optical channel in the second waveguide layer 22 after being reflected by the prism 32, and to be output through the optical channel in the second waveguide layer 22.

Figure 3B:
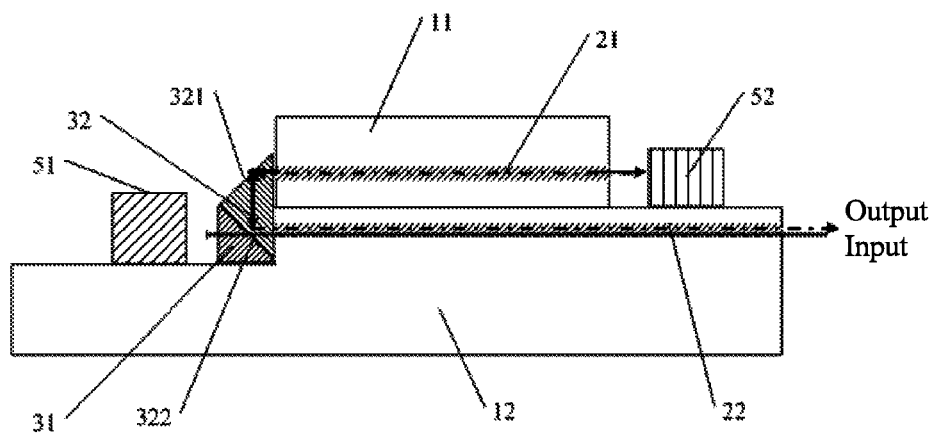
FIG. 3b is a structural diagram of an optical module according to an embodiment of the present application.

Alternatively, as shown in FIG. 3b, in an embodiment, the optical module may further include: a second PD 52 and a second LD 51 which are mounted on the first substrate 11 and the second substrate 12 respectively, where a position among the filter 31, the prism 32, the first waveguide layer 21 and the second waveguide layer 22 enables an optical signal transmitted by the second LD 51 to enter the filter 31, then to enter the optical channel in the second waveguide layer 22 after being transmitted by the prism 32, and to be output through the optical channel in the second waveguide layer 22; and an optical signal input to the optical channel in the second waveguide layer 22 to enter the optical channel in the first waveguide layer 21 after being reflected by the prism 32, and to enter the second PD 52 through the optical channel in the first waveguide layer 21.

That is to say, relative to the embodiment shown in FIG. 3a, positions of the LD and the PD are exchanged in the embodiment shown in FIG. 3b.

In an embodiment, the first substrate 11 and the second substrate 12 are formed on a preset material (for example, glass).

In an embodiment, the optical channel of the first waveguide layer 21 and the optical channel of the second waveguide layer 22 each is made of a preset optical waveguide material with a refractive index which is greater than that of the material of the substrate.

In an embodiment, the filter 31 is bonded to a surface of the second substrate 12 through an adhesive, tin soldering or ultrasonic soldering. In an embodiment, the prism 32 is bonded to a surface of the filter 31 through an adhesive, tin soldering or ultrasonic soldering.

In an embodiment, the first LD 41 and the first PD 42 are bonded to a surface of the first substrate 11 and a surface of the second substrate 12 through an adhesive, tin soldering or ultrasonic soldering respectively. Alternatively, in an embodiment, the second PD 52 and the second LD 51 are bonded to a surface of the first substrate 11 and a surface of the second substrate 12 through an adhesive, tin soldering or ultrasonic soldering respectively.

It should be noted that, in an embodiment, the preceding adhesive used for bonding may be an adhesive with a CTE which is close to a CTE of the first substrate 11 or the second substrate 12. That is to say, an absolute value of a difference between the CTE of the preceding adhesive used for bonding and the CTE of the first substrate 11 or the second substrate 12 is in a preset range.

In an embodiment, a filter film is coated on at least one surface of the filter 31. In an embodiment, a total reflection film is coated on the first reflective surface 321 of the prism 32, where the first reflective surface 321 of the prism 32 is aligned with the first waveguide layer 21; and an anti-reflection film is coated on the second reflective surface 322 of the prism 32, where the second reflective surface 322 of the prism 32 is aligned with the second waveguide layer 22.

In an embodiment, the first LD 41 is electrically connected to the first PD 42, and the electrical connection between the first LD 41 and the first PD 42 may be accomplished by using soldering or lead binding. In an embodiment, the second LD 51 is electrically connected to the second PD 52, and the electrical connection between the second LD 51 and the second PD 52 may be accomplished by using soldering or lead binding.

Through the embodiment of the present application, the optical module is fabricated with two waveguide layers in a perpendicular direction (Z direction), the two waveguide layers, the prism, the filter, the LD and the PD form a photoelectric path, and a positional relationship among the two waveguide layers, the prism, and the filter enables an optical signal input to the optical channel in the second waveguide layer to enter the filter after being transmitted by the prism; and an optical signal input to the optical channel in the first waveguide layer to enter the optical channel in the second waveguide layer after being reflected by the prism, and to be output through the optical channel in the second waveguide layer. Therefore, Z-direction space is fully utilized, thereby reducing the width of the optical channel and the planar space occupied by the optical module, improving the I/O density of the optical module, and further improving the entire system density of the system where the optical module is located.

As shown in FIG. 4, an embodiment of the present application provides an optical module, including: a first substrate 11, a second substrate 12, a first waveguide layer 21, a second waveguide layer 22, a filter 31 and a prism 32.

The first waveguide layer 21 and the second waveguide layer 22 are located on a first surface of the first substrate 11 and a second surface of the first substrate 11 respectively, the first substrate 11 is parallel to the second substrate 12, the first waveguide layer 21 includes at least one optical channel, and the second waveguide layer 22 includes at least one optical channel. The first waveguide layer 21 is parallel to the second waveguide layer 22, the first waveguide layer 21 is parallel to the second substrate 12, and the first substrate 11 is disposed on the second substrate 12.

The filter 31 is disposed at an end of the first waveguide layer 21 and the second waveguide layer 22, and is aligned with the second waveguide layer 22. The prism 32 is disposed on the filter 31, and two reflective surfaces of the prism 32 are aligned with the first waveguide layer 21 and the second waveguide layer 22 respectively.

A position among the filter 31, the prism 32, the first waveguide layer 21 and the second waveguide layer 22 enables an optical signal input to the optical channel in the second waveguide layer 22 to enter the filter 31 after being transmitted by the prism 32; and an optical signal input to the optical channel in the first waveguide layer 21 to enter the optical channel in the second waveguide layer 22 after being reflected by the prism 32, and to be output through the optical channel in the second waveguide layer 22.

In an embodiment, as shown in FIG. 4, the filter 31 may be mounted on the second substrate. Further, in an embodiment, the filter 31 may be bonded to a surface of the second substrate 12 through an adhesive, tin soldering or ultrasonic soldering, so that the filter 31 is located at an end of the first waveguide layer 21 and the second waveguide layer 22, and is aligned with the second waveguide layer 22.

In an embodiment, the first waveguide layer 21 and the second waveguide layer 22 may be located on an upper surface of the first substrate 11 and a lower surface of the first substrate 11 respectively. That is, the first surface of the first substrate and the second surface of the first substrate are the upper surface of the first substrate and the lower surface of the first substrate respectively.

In an embodiment, the first waveguide layer 21 and the second waveguide layer 22 may be located inside (namely, on an inner portion of) the first substrate 11. That is, the first surface of the first substrate and the second surface of the first substrate are located inside the first substrate.

It should be noted that, in an embodiment, the preceding adhesive used for bonding may be an adhesive with a CTE which is close to a CTE of the second substrate. That is to say, an absolute value of a difference between the CTE of the preceding adhesive used for bonding and the CTE of the second substrate is in a preset range.

It should be noted that, in an embodiment, widths of cross-sections of the first waveguide layer 21 and the second waveguide layer 22 are equal, or widths of cross-sections of the first waveguide layer 21 and the second waveguide layer 22 are equal in an allowable error range.

Through the foregoing technical solution in the embodiment of the present application, the optical module is fabricated with two waveguide layers in a perpendicular direction (Z direction), the two waveguide layers, the prism, and the filter form an optical path, and a positional relationship among the two waveguide layers, the prism, and the filter enables an optical signal input to the optical channel in the second waveguide layer to enter the filter after being transmitted by the prism; and an optical signal input to the optical channel in the first waveguide layer to enter the optical channel in the second waveguide layer after being reflected by the prism, and to be output through the optical channel in the second waveguide layer. Therefore, Z-direction space is fully utilized, thereby reducing the width of the optical channel and planar space occupied by the optical module, improving I/O density of the optical module, and further improving entire system density of a system where the optical module is located.

Figure 4A:
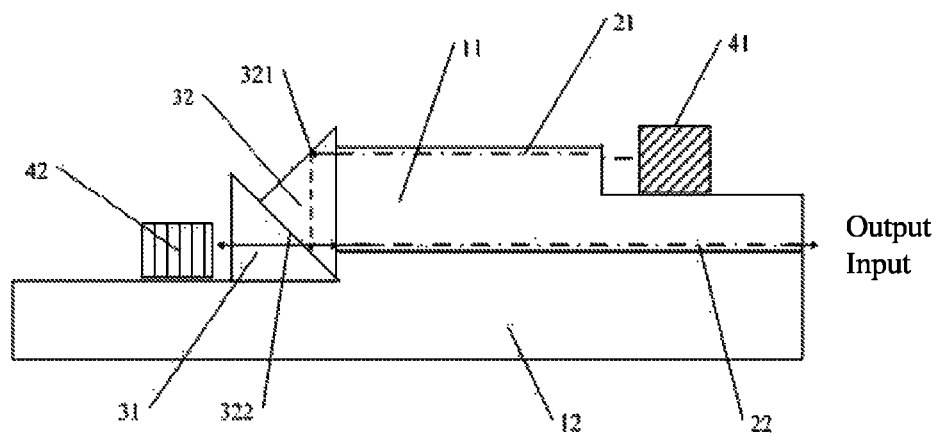
FIG. 4a is a structural diagram of an optical module according to an embodiment of the present application.

As shown in FIG. 4a, in an embodiment, the optical module may further include: a first LD 41 and a first PD 42 which are mounted on the first substrate 11 and the second substrate 12 respectively, where a position among the filter 31, the prism 32, the first waveguide layer 21 and the second waveguide layer 22 enables an optical signal input to the optical channel in the second waveguide layer 22 to enter the filter 31 after being transmitted by the prism 32, and to enter the first PD 42 through the filter 31; and an optical signal transmitted by the first LD 41 to enter the optical channel in the first waveguide layer 21, then to enter the optical channel in the second waveguide layer 22 after being reflected by the prism 32, and to be output through the optical channel in the second waveguide layer 22.

Figure 4B:
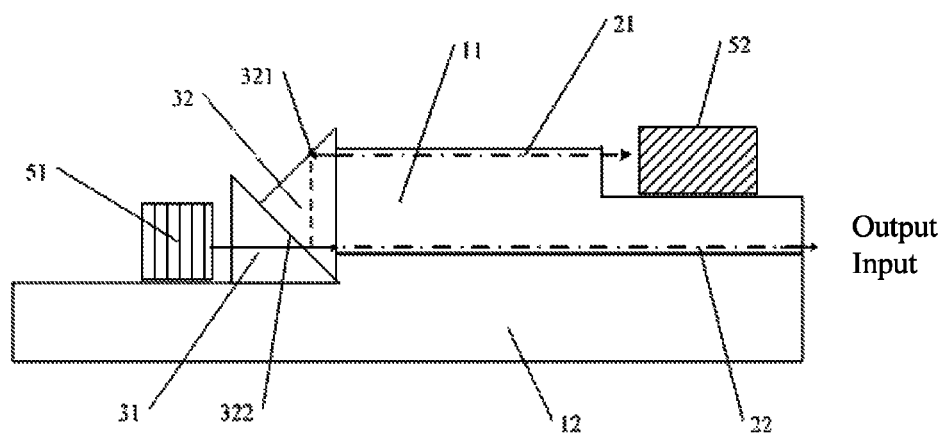
FIG. 4b is a structural diagram of an optical module according to an embodiment of the present application.

Alternatively, as shown in FIG. 4b, in an embodiment, the optical module may further include: a second PD 52 and a second LD 51 which are mounted on the first substrate 11 and the second substrate 12 respectively, where a position among the filter 31, the prism 32, the first waveguide layer 21 and the second waveguide layer 22 enables an optical signal transmitted by the second LD 51 to enter the filter 31, then to enter the optical channel in the second waveguide layer 22 after being transmitted by the prism 32, and to be output through the optical channel in the second waveguide layer 22; and an optical signal input to the optical channel in the second waveguide layer 22 to enter the optical channel in the first waveguide layer 21 after being reflected by the prism 32, and to enter the second PD 52 through the optical channel in the first waveguide layer 21.

That is to say, relative to the embodiment shown in FIG. 4a, positions of the LD and the PD are exchanged in the embodiment shown in FIG. 4b.

In an embodiment, the first substrate 11 and the second substrate 12 are formed on a preset material (for example, glass).

In an embodiment, the optical channel of the first waveguide layer 21 and the optical channel of the second waveguide layer 22 each is made of a preset optical waveguide material with a refractive index which is greater than that of the material of the substrates (the first substrate and the second substrate).

In an embodiment, the filter 31 is bonded to a surface of the second substrate 12 in a manner of an adhesive, tin soldering or ultrasonic soldering. In an embodiment, the prism 32 is bonded to a surface of the filter 31 in a manner of an adhesive, tin soldering or ultrasonic soldering.

In an embodiment, the first LD 41 and the first PD 42 are bonded to a surface of the first substrate 11 and a surface of the second substrate 12 in a manner of an adhesive, tin soldering or ultrasonic soldering respectively. Alternatively, in an embodiment, the second PD 52 and the second LD 51 are bonded to a surface of the first substrate 11 and a surface of the second substrate 12 in a manner of an adhesive, tin soldering or ultrasonic soldering respectively.

It should be noted that, in an embodiment, the preceding adhesive used for bonding may be an adhesive with a CTE which is close to a CTE of the first substrate 11 or the second substrate 12. That is to say, an absolute value of a difference between the CTE of the preceding adhesive used for bonding and the CTE of the first substrate 11 or the second substrate 12 is in a preset range.

In an embodiment, a filter film is coated on at least one surface of the filter 31. In an embodiment, a total reflection film is coated on the first reflective surface 321 of the prism 32, where the first reflective surface 321 of the prism 32 is aligned with the first waveguide layer 21; and an anti-reflection film is coated on the second reflective surface 322 of the prism 32, where the second reflective surface 322 of the prism 32 is aligned with the second waveguide layer 22.

In an embodiment, the first LD 41 is electrically connected to the first PD 42, and the electrical connection between the first LD 41 and the first PD 42 may be accomplished by using soldering or lead binding. In an embodiment, the second LD 51 is electrically connected to the second PD 52, and the electrical connection between the second LD 51 and the second PD 52 may be accomplished by using soldering or lead binding.

Through the embodiment of the present application, the optical module is fabricated with two waveguide layers in a perpendicular direction (Z direction), the two waveguide layers, the prism, the filter, the LD and the PD form a photoelectric path, and a positional relationship among the two waveguide layers, the prism, and the filter enables an optical signal input to the optical channel in the second waveguide layer to enter the filter after being transmitted by the prism; and an optical signal input to the optical channel in the first waveguide layer to enter the optical channel in the second waveguide layer after being reflected by the prism, and to be output through the optical channel in the second waveguide layer. Therefore, Z-direction space is fully utilized, thereby reducing the width of the optical channel and the planar space occupied by the optical module, improving the I/O density of the optical module, and further improving the entire system density of the system where the optical module is located.

Figure 5:
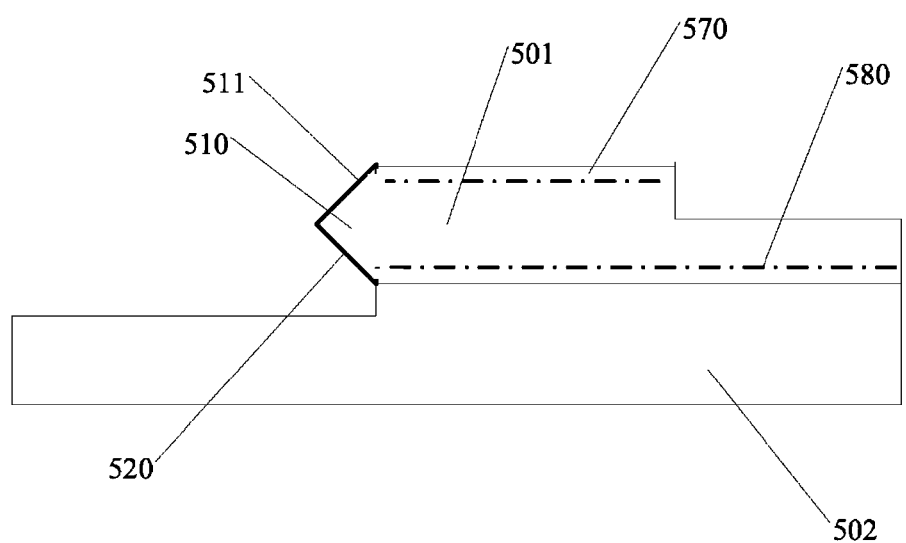
FIG. 5 is a structural diagram of an optical module according to an embodiment of the present application.

As shown in FIG. 5, an embodiment of the present application provides an optical module. In this embodiment, in a proper processing method (for example, a deposition method, an ion-exchange method or a film coating process), a prism and a filter are integrally formed on a first substrate. That is, the prism and the filter are fabricated on an end surface at one side of the first substrate, and the fabricated filter and prism are integrally formed with the first substrate.

The optical module includes: a first substrate 501, a second substrate 502, a first waveguide layer 570, a second waveguide layer 580, a prism 510 and a filter 520.

The first waveguide layer 570 and the second waveguide layer 580 are located on a first surface of the first substrate 501 and a second surface of the first substrate 501 respectively (in an embodiment, the first surface and the second surface may be an upper surface of the first substrate and a lower surface of the first substrate respectively; and in another embodiment, the first surface and the second surface may also be two surfaces inside the first substrate), the first waveguide layer 570 is located above the second waveguide layer 580; a surface of the first substrate 501 is parallel with a surface of the second substrate 502, the first waveguide layer 570 includes at least one optical channel, and the second waveguide layer 580 includes at least one optical channel; the first waveguide layer 570 is parallel to the second waveguide layer 580, the first waveguide layer 570 is parallel to the second substrate 502, and the first substrate 501 is disposed on the second substrate 502.

A first reflective surface 511 of the prism 510 and a second reflective surface 520 of the prism 510 are both located on an end surface at one side of the first substrate 501 (in this embodiment, as shown in FIG. 5, located on the end surface at the left side of the first substrate 501), the first reflective surface 511 and the second reflective surface 520 are aligned with the first waveguide layer 570 and the second waveguide layer 580 respectively; a total reflection film is coated on the first reflective surface 511 of the prism 510, and a filter film is coated on the second reflective surface 520 to form a filter which has a filtering function, that is, in this embodiment, the filter 520 and the prism 510 are integrally formed.

Figure 5A:
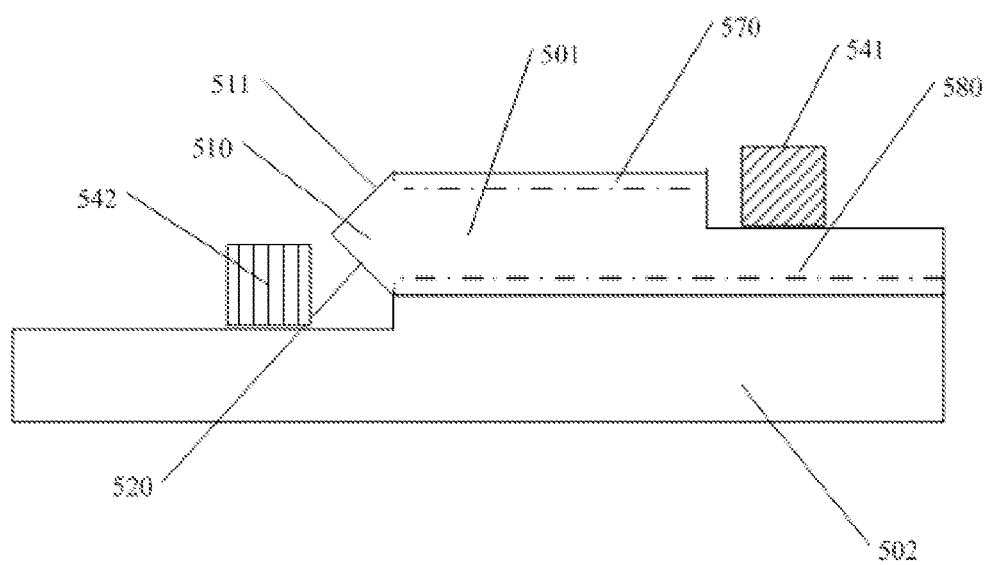
FIG. 5a is a structural diagram of an optical module according to an embodiment of the present application.

As shown in FIG. 5a, in an embodiment, the optical module further includes: a first LD 541 and a first PD 542 which are mounted on the first substrate 501 and the second substrate 502 respectively, where a position among the filter 520, the prism 510, the first waveguide layer 570 and the second waveguide layer 580 enables an optical signal input to the optical channel in the second waveguide layer 580 to enter the first PD 542 through the second reflective surface 520 (that is, the filter 520) of the prism 510; and an optical signal transmitted by the first LD 541 to enter the optical channel in the first waveguide layer 570, then to enter the optical channel in the second waveguide layer 580 after being reflected by the first reflective surface 511 of the prism 510 and the second reflective surface (that is, the filter 520) of the prism 510, and to be output through the optical channel in the second waveguide layer 580.

Figure 5B:
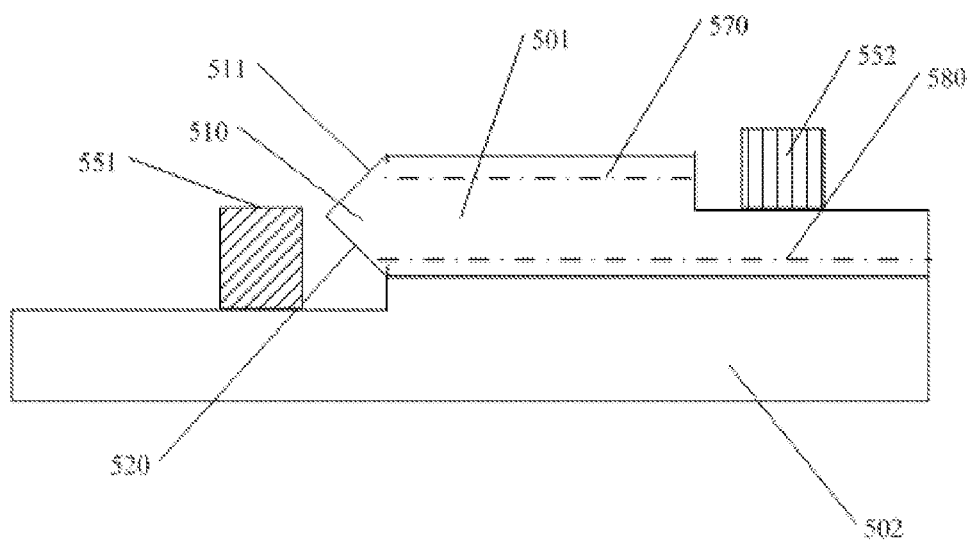
FIG. 5b is a structural diagram of an optical module according to an embodiment of the present application.

Alternatively, as shown in FIG. 5b, in an embodiment, the optical module further includes: a second PD 552 and a second LD 551 which are mounted on the first substrate 501 and the second substrate 502 respectively, where a position among the filter 520, the prism 510, the first waveguide layer 570 and the second waveguide layer 580 enables an optical signal transmitted by the second LD 551 to enter the filter 520, then to enter the optical channel in the second waveguide layer 580, and to be output through the optical channel in the second waveguide layer 580; and an optical signal input to the optical channel in the second waveguide layer 580 to enter the optical channel in the first waveguide layer 570 after being reflected by the second reflective surface 520 (that is, the filter 520) of the prism 510 and the first reflective surface 511 of the prism 510, and to enter the second PD 552 through the optical channel in the first waveguide layer 570.

It should be noted that, in an embodiment, the first reflective surface and the second reflective surface each forms a 45° angle with the first waveguide layer.

It should be noted that, in an embodiment, widths of cross-sections of the first waveguide layer 570 and the second waveguide layer 580 are equal, or widths of cross-sections of the first waveguide layer 570 and the second waveguide layer 580 are equal in an allowable error range.

Through the embodiment of the present application, the optical module is fabricated with two waveguide layers in a perpendicular direction (Z direction), the two waveguide layers, the prism, the filter, the LD and the PD form a photoelectric path, and a positional relationship among the two waveguide layers, the prism, and the filter enables an optical signal input to the optical channel in the second waveguide layer to enter the filter after being transmitted by the prism; and an optical signal input to the optical channel in the first waveguide layer to enter the optical channel in the second waveguide layer after being reflected by the prism, and to be output through the optical channel in the second waveguide layer. Therefore, Z-direction space is fully utilized, thereby reducing the width of the optical channel and planar space occupied by the optical module, improving I/O density of the optical module, and further improving entire system density of a system where the optical module is located.

The foregoing are only several embodiments of the present application. Persons skilled in the art may make various modifications and variations to the present application according to the disclosure of the application document without departing from the scope of the present application.

What is claimed is:

1. An optical module manufacturing method comprising:
   forming a first waveguide layer and a second waveguide layer on a first substrate and a second substrate respectively, or forming a first waveguide layer and a second waveguide layer on a first surface of a first substrate and a second surface of the first substrate respectively, wherein the first waveguide layer and the second waveguide layer each comprises at least one optical channel, wherein the first waveguide layer is located above the second waveguide layer, and wherein the first waveguide layer is parallel to the second waveguide layer;
   disposing the first substrate on the second substrate such that the first substrate is parallel to the second substrate, and the first waveguide layer is parallel to the second substrate;
   disposing a filter at an end of the first waveguide layer and the second waveguide layer such that the filter is aligned with the second waveguide layer; and
   disposing a prism on the filter, so that a first reflective surface of the prism is aligned with the first waveguide layer, and a second reflective surface is aligned with the second waveguide layer,
   wherein a positional relationship among the filter, the prism, the first waveguide layer and the second waveguide layer enables an optical signal input to the optical channel in the second waveguide layer to enter the filter after being transmitted by the prism, and
   wherein the positional relationship among the filter, the prism, the first waveguide layer and the second waveguide layer enables an optical signal input to the optical channel in the first waveguide layer to enter the optical channel in the second waveguide layer after being reflected by the prism and to be output through the optical channel in the second waveguide layer.

2. The optical module manufacturing method according to claim 1, further comprising mounting a first optical transmitter laser diode (LD) and a first optical receiver photo diode (PD) on the first substrate and the second substrate respectively, wherein the first LD is electrically connected to the first PD, wherein a position among the filter, the prism, the first waveguide layer, the second waveguide layer, the first LD and the first PD enables an optical signal input to the optical channel in the second waveguide layer to enter the filter after being transmitted by the prism and to enter the first PD through the filter, and wherein the position among the filter, the prism, the first waveguide layer, the second waveguide layer, the first LD and the first PD enables an optical signal transmitted by the first LD to enter the optical channel in the first waveguide layer, then to enter the optical channel in the second waveguide layer after being reflected by the prism, and to be output through the optical channel in the second waveguide layer.

3. The optical module manufacturing method according to claim 1, further comprising mounting a second optical receiver PD and a second optical transmitter LD on the first substrate and the second substrate respectively, wherein the first LD is electrically connected to the second PD, wherein a position among the filter, the prism, the first waveguide layer, the second waveguide layer, the second PD and the second LD enables an optical signal transmitted by the second LD to enter the filter, then to enter the optical channel in the second waveguide layer after being transmitted by the prism, and to be output through the optical channel in the second waveguide layer, and wherein the position among the filter, the prism, the first waveguide layer, the second waveguide layer, the second PD and the second LD enables an optical signal input to the optical channel in the second waveguide layer to enter the optical channel in the first waveguide layer after being reflected by the prism and to enter the second PD through the optical channel in the first waveguide layer.

4. The optical module manufacturing method according to claim 1, wherein disposing the filter at the end of the first waveguide layer and the second waveguide layer such that the filter is aligned with the second waveguide layer comprises mounting a filter on the second substrate such that the filter is located at the end of the first waveguide layer and the second waveguide layer, and the filter is aligned with the second waveguide layer.

5. The optical module manufacturing method according to claim 1, wherein disposing the filter at the end of the first waveguide layer and the second waveguide layer such that the filter is aligned with the second waveguide layer comprises when the first waveguide layer and the second waveguide layer are formed on the first surface of the first substrate and the second surface of the first substrate respectively, fabricating a filter on an end surface at one side of the first substrate such that the filter and the first substrate are integrally formed, and the filter is aligned with the second waveguide layer.

6. The optical module manufacturing method according to claim 5, wherein disposing the prism on the filter such that the first reflective surface of the prism is aligned with the first waveguide layer comprises:
   using the filter as the second reflective surface of the prism; and
   fabricating the first reflective surface of the prism on an end surface at one side of the first substrate such that the first reflective surface of the prism is aligned with the first waveguide layer.

7. The optical module manufacturing method according to claim 1, further comprising:
   coating a total reflection film on the first reflective surface of the prism; and
   coating an anti-reflection film on the second reflective surface of the prism.

8. The optical module manufacturing method according to claim 1, wherein a filter film is coated on at least one surface of the filter.

9. The optical module manufacturing method according to claim 6, further comprising:
   coating a total reflection film on the first reflective surface of the prism; and
   coating a filter film on the second reflective surface of the prism.

10. The optical module manufacturing method according to claim 5, wherein mounting the filter on the second substrate comprises bonding the filter to a surface of the second substrate by an adhesive, wherein an absolute value of a difference between a coefficient of thermal expansion (CTE) of the adhesive and a CTE of the second substrate is within a preset range.

11. The optical module manufacturing method according to claim 1, wherein disposing the prism on the filter comprises:
bonding the prism to a surface of the filter by an adhesive, wherein an absolute value of a difference between a CTE of the adhesive and a CTE of the second substrate is within a preset range; or
bonding the prism to a surface of the filter through tin soldering or ultrasonic soldering.

12. An optical module comprising:
a first substrate;
a second substrate;
a first waveguide layer;
a second waveguide layer;
a filter; and
a prism,
wherein the first waveguide layer and the second waveguide layer are located on the first substrate and the second substrate respectively, or are located on a first surface of the first substrate and a second surface of the first substrate respectively,
wherein the first substrate is parallel to the second substrate,
wherein the first waveguide layer and the second waveguide layer each comprises at least one optical channel,
wherein the first waveguide layer is located above the second waveguide layer,
wherein the first waveguide layer is parallel to the second waveguide layer,
wherein the first waveguide layer is parallel to the second substrate,
wherein the first substrate is set on the second substrate,
wherein the filter is disposed at an end of the first waveguide layer and the second waveguide layer such that the filter is aligned with the second waveguide layer,
wherein the prism is disposed on the filter such that a first reflective surface of the prism and a second reflective surface of the prism are aligned with the first waveguide layer and the second waveguide layer respectively,
wherein a positional relationship among the filter, the prism, the first waveguide layer and the second waveguide layer enables an optical signal input to the optical channel in the second waveguide layer to enter the filter after being transmitted by the prism, and
wherein the positional relationship among the filter, the prism, the first waveguide layer and the second waveguide layer enables an optical signal input to the optical channel in the first waveguide layer to enter the optical channel in the second waveguide layer after being reflected by the prism and to be output through the optical channel in the second waveguide layer.

13. The optical module according to claim 12, further comprising:
a first LD; and
a first PD,
wherein the first LD and the first PD are mounted on the first substrate and the second substrate respectively,
wherein the first LD is electrically connected to the first PD,
wherein a position among the filter, the prism, the first waveguide layer and the second waveguide layer enables an optical signal input to the optical channel in the second waveguide layer to enter the filter after being transmitted by the prism and to enter the first PD through the filter, and
wherein the position among the filter, the prism, the first waveguide layer and the second waveguide layer enables an optical signal transmitted by the first LD to enter the optical channel in the first waveguide layer, then to enter the optical channel in the second waveguide layer after being reflected by the prism, and to be output through the optical channel in the second waveguide layer.

14. The optical module according to claim 12, further comprising:
a second PD; and
a second LD,
wherein the second PD and the second LD are mounted on the first substrate and the second substrate respectively,
wherein the second PD is electrically connected to the second LD,
wherein a position among the filter, the prism, the first waveguide layer and the second waveguide layer enables an optical signal transmitted by the second LD to enter the filter, then to enter the optical channel in the second waveguide layer after being transmitted by the prism, and to be output through the optical channel in the second waveguide layer, and
wherein the position among the filter, the prism, the first waveguide layer and the second waveguide layer enables an optical signal input to the optical channel in the second waveguide layer to enter the optical channel in the first waveguide layer after being reflected by the prism and to enter the second PD through the optical channel in the first waveguide layer.

15. The optical module according to claim 1, wherein a total reflection film is coated on the first reflective surface of the prism, and wherein an anti-reflection film is coated on the second reflective surface of the prism.

16. The optical module according to claim 1, wherein a filter film is coated on at least one surface of the filter.

17. The optical module according to claim 12, wherein widths of cross-sections of the first waveguide layer and the second waveguide layer are equal, or wherein widths of cross-sections of the first waveguide layer and the second waveguide layer are equal within an allowable error range.

18. The optical module according to claim 12, wherein when the first waveguide layer and the second waveguide layer are formed on the first surface of the first substrate and the second surface of the first substrate respectively, and wherein the filter, the prism and the first substrate are integrally formed.

19. The optical module according to claim 18, wherein the first reflective surface of the prism and the filter are located on an end surface at one side of the first substrate, and wherein the filter is the second reflective surface of the prism.

20. The optical module according to claim 18, wherein a total reflection film is coated on the first reflective surface of the prism, and wherein a filter film is coated on the second reflective surface of the prism.

21. The optical module according to claim 12, wherein the filter is mounted on the second substrate.

* * * * *